United States Patent [19]

France et al.

[11] Patent Number: 5,754,790

[45] Date of Patent: May 19, 1998

[54] APPARATUS AND METHOD FOR SELECTING IMPROVED ROUTING PATHS IN AN AUTONOMOUS SYSTEM OF COMPUTER NETWORKS

[75] Inventors: Robert Millard France, Littleton, Mass.; David J. Husak, Windham, N.H.

[73] Assignee: 3Com Corporation, Santa Clara, Calif.

[21] Appl. No.: 641,506

[22] Filed: May 1, 1996

[51] Int. Cl.$^6$ ............................................. G06F 15/173
[52] U.S. Cl. .................................................. 395/200.68
[58] Field of Search ........................ 395/200.15, 200.16, 395/200.17, 200.18, 200.2

[56] References Cited

U.S. PATENT DOCUMENTS

| | | | |
|---|---|---|---|
| 4,823,338 | 4/1989 | Chan et al. | 370/85 |
| 5,208,811 | 5/1993 | Kashio et al. | 370/94.1 |
| 5,214,646 | 5/1993 | Yacoby | 370/85.14 |
| 5,243,592 | 9/1993 | Perlman et al. | 370/17 |
| 5,311,584 | 5/1994 | Bogart et al. | 379/220 |
| 5,361,256 | 11/1994 | Doeringer et al. | 370/60 |
| 5,390,184 | 2/1995 | Morris | 370/94.2 |
| 5,392,399 | 2/1995 | Gilbrech | 395/200 |
| 5,394,402 | 2/1995 | Ross | 370/94.1 |
| 5,430,729 | 7/1995 | Rachnema | 370/941 |
| 5,432,907 | 7/1995 | Picazo, Jr. et al. | 395/200 |
| 5,442,630 | 8/1995 | Gagliardi et al. | 370/85.13 |
| 5,444,702 | 8/1995 | Burnett et al. | 370/60.1 |
| 5,444,703 | 8/1995 | Gagliardi et al. | 370/60.1 |
| 5,453,980 | 9/1995 | Van Engelshoven | 370/60.1 |
| 5,526,358 | 6/1996 | Gregerson | 370/94.3 |
| 5,570,466 | 10/1996 | Oechsie | 395/200.15 |
| 5,612,957 | 3/1997 | Gregerson | 370/401 |

*Primary Examiner*—David Y. Eng
*Attorney, Agent, or Firm*—Weingarten, Schurgin, Gagnebin & Hayes LLP

[57] ABSTRACT

An apparatus and method for selecting improved routing paths in an autonomous system having at least two computer networks while retaining the benefits of Routing Information Protocol (RIP) are disclosed. Such an apparatus and method are realized by having network bridges identify and, in certain circumstances, modify RIP update messages according to information retrieved from a routing database, or table, of an associated network router. More particularly, the network bridges modify RIP messages so that they will more accurately reflect the position of the network router that broadcast the RIP message, relative to the position of the associated network router, with respect any given destination network.

23 Claims, 6 Drawing Sheets

APPARATUS AND METHOD FOR SELECTING IMPROVED ROUTING PATHS IN AN AUTONOMOUS SYSTEM OF COMPUTER NETWORKS

FIELD OF INVENTION

The present invention relates generally to networking and, more particularly, to an apparatus and method for selecting improved routing paths in an autonomous system having at least two computer networks.

BACKGROUND OF THE INVENTION

In an autonomous system comprising at least two computer networks, it is necessary for certain network elements, typically hosts and routers, to know of other computer networks so as to be able to communicate with other network elements attached to those other computer networks. The methods by which certain network elements of a computer network learn about other computer networks, and hence other network elements within a system of computer networks, are commonly referred to as interior routing protocols. One widely used interior routing protocol is known as Routing Information Protocol (RIP), which relies upon physical network broadcasts to disseminate routing and reachability information throughout the computer network system.

The underlying methodology of RIP is a straightforward implementation of distance-vector routing for local area networks. Network elements are classified as being either active (vocal) or passive (silent). Active elements advertise, or broadcast, their routes to others, while passive elements listen and update their routes based upon the advertisements, or broadcasts, of others, but do not advertise, or broadcast, themselves. Typically, routers operate in an active RIP mode, while hosts operate in a passive RIP mode.

A network element operating in an active RIP mode typically broadcasts a message every 30 seconds. Each such message contains information taken from a routing database, or table, and comprises a message pair that contains a destination network address and an integer distance between that network element and the destination network address. RIP uses a hop count metric to measure such an integer distance, wherein a router is defined to be one hop from directly connected networks, two hops from networks that are reachable through one other router, and so on. Thus, the number of hops, or the hop count, along a routing path from a given source to a given destination refers to the number of routers that a data packet would encounter along that routing path.

Both active and passive RIP participants listen to all broadcast messages and update their routing databases, or tables, according to the distance-vector routing algorithm described above. Eventually all routers and hosts will have a routing path to any given network stored in their routing databases, or tables. It should be noted, however, that RIP specifies that once a network element learns a route from another network element, it must keep that route until it learns of a better one. In other words, to prevent a router or host from oscillating between two or more equally efficient (equal cost) routing paths, RIP specifies that existing routing paths should be retained until a new routing path having a lower hop count is available.

Figure 1:
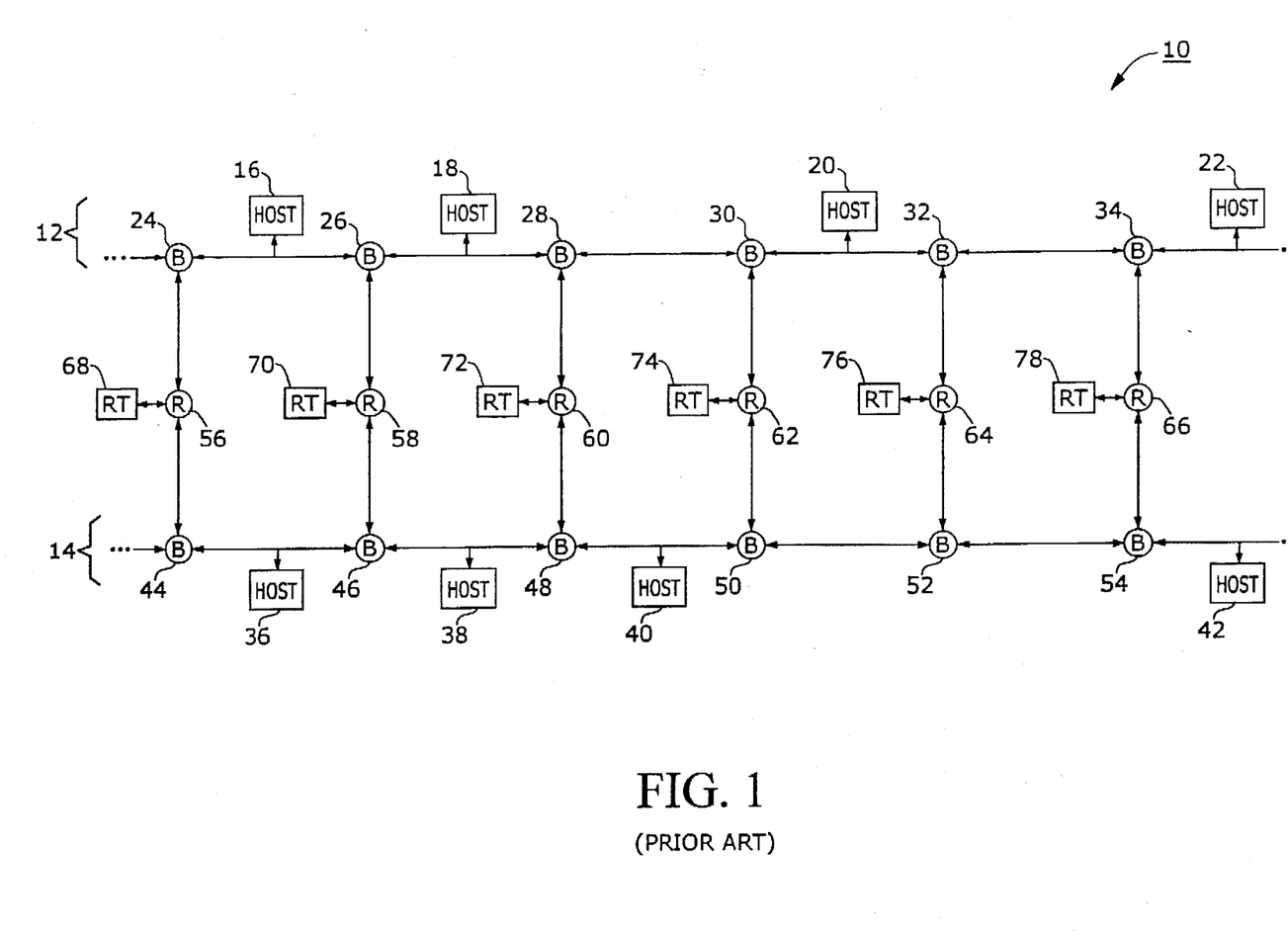
FIG. 1 is a schematic block diagram of a prior art computer network system having two computer networks interconnected by several routers.
Figure 2:
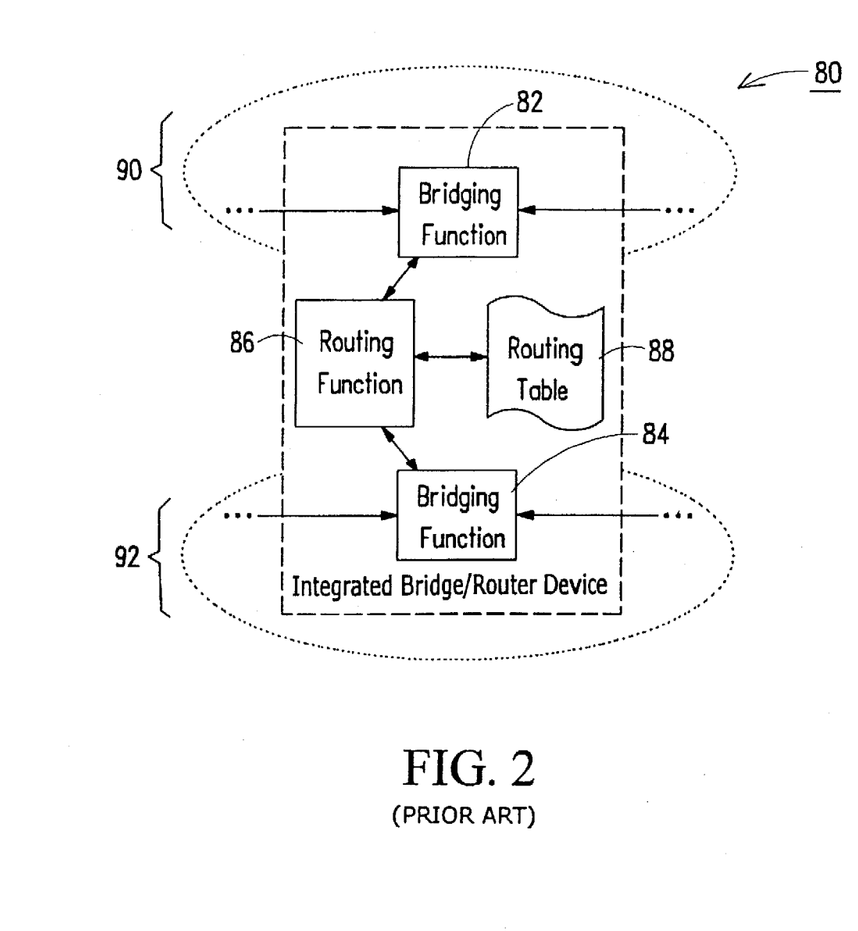
FIG. 2 is a schematic block diagram of a prior art integrated bridge/router device for use in a computer network system having at least two computer networks.

To illustrate the above-described operation of RIP, refer to FIG. 1, where there is shown a prior art computer network system 10 having two interconnected computer networks 12 and 14. Network 12 has several hosts 16, 18, 20, and 22, and several bridges 24, 26, 28, 30, 32, and 34. Network 14 also has several hosts 36, 38, 40, and 42, and several bridges 44, 46, 48, 50, 52, and 54. Located between and interconnecting the networks 12 and 14 are several routers 56, 58, 60, 62, 64, and 66, each having an associated routing database, or table, 68, 70, 72, 74, 76, and 78, respectively. Referring to FIG. 2, there is shown a prior art integrated bridge/router device 80 comprising two bridges 82 and 84, a router 86, and an associated routing database, or table, 88, which provide interconnection means for two networks 90 and 92. Such a device 80 is commonly used in computer network systems, such as the one described above. One such device is manufactured by the assignee of the present invention and is sold under the tradename LANplex.

Referring again to FIG. 1, router 60, for example, will broadcast a RIP message that contains the pair (12, 1) on network 14, meaning that router 60 can reach network 12 from network 14 in one hop (at cost 1). Router 60 will also broadcast a RIP message that contains the pair (14, 1) on network 12, meaning that it can reach network 14 from network 12 in one hop (at cost 1). Routers 56, 58, 62, 64, and 66 will also broadcast similar RIP messages, but at some later time. Thus, since router 60 was the first router to broadcast and no lower cost routing paths were later broadcast, hosts 16, 18, 20, and 22 and hosts 36, 38, 40, and 42 will all have stored in associated internal routing databases, or tables, routing paths between networks 12 and 14 through router 60. In other words, hosts 16, 18, 20, and 22 would send and receive data to and from hosts 36, 38, 40, and 42 only through routing paths utilizing router 60.

From the above-described illustration, it should be apparent that the particular aspect of RIP wherein hop counts are used to calculate the shortest path distance between a given source and a given destination does not always produce optimal, or even near optimal, results since bridges, and their associated delays, are not taken into account when determining the hop counts. Thus, it would be desirable to provide an apparatus and method for selecting improved routing paths in a computer network system having at least two computer networks by taking bridges into account when selecting such routing paths.

SUMMARY OF THE INVENTION

In accordance with the present invention, an apparatus and method for selecting improved routing paths in a computer network system having at least two computer networks is disclosed. Such an apparatus and method are realized by having network bridges in the computer network system identify and, in certain circumstances, modify RIP update messages according to information retrieved from a routing database, or table, of an associated network router. More particularly, the network bridges modify RIP messages so that they will more accurately reflect the position of the network router that broadcast the RIP message, relative to the position of the associated network router, with respect to any given destination network. Thus, the presently disclosed apparatus and method essentially take network bridges into account when determining the best possible routing paths within the computer network system. As a consequence, more direct routing paths are typically utilized and unnecessary delays through bridges are avoided.

BRIEF DESCRIPTION OF THE DRAWINGS

The present invention will be more fully understood by reference to the following detailed description and the appended drawings of which.

DETAILED DESCRIPTION

Figure 3:
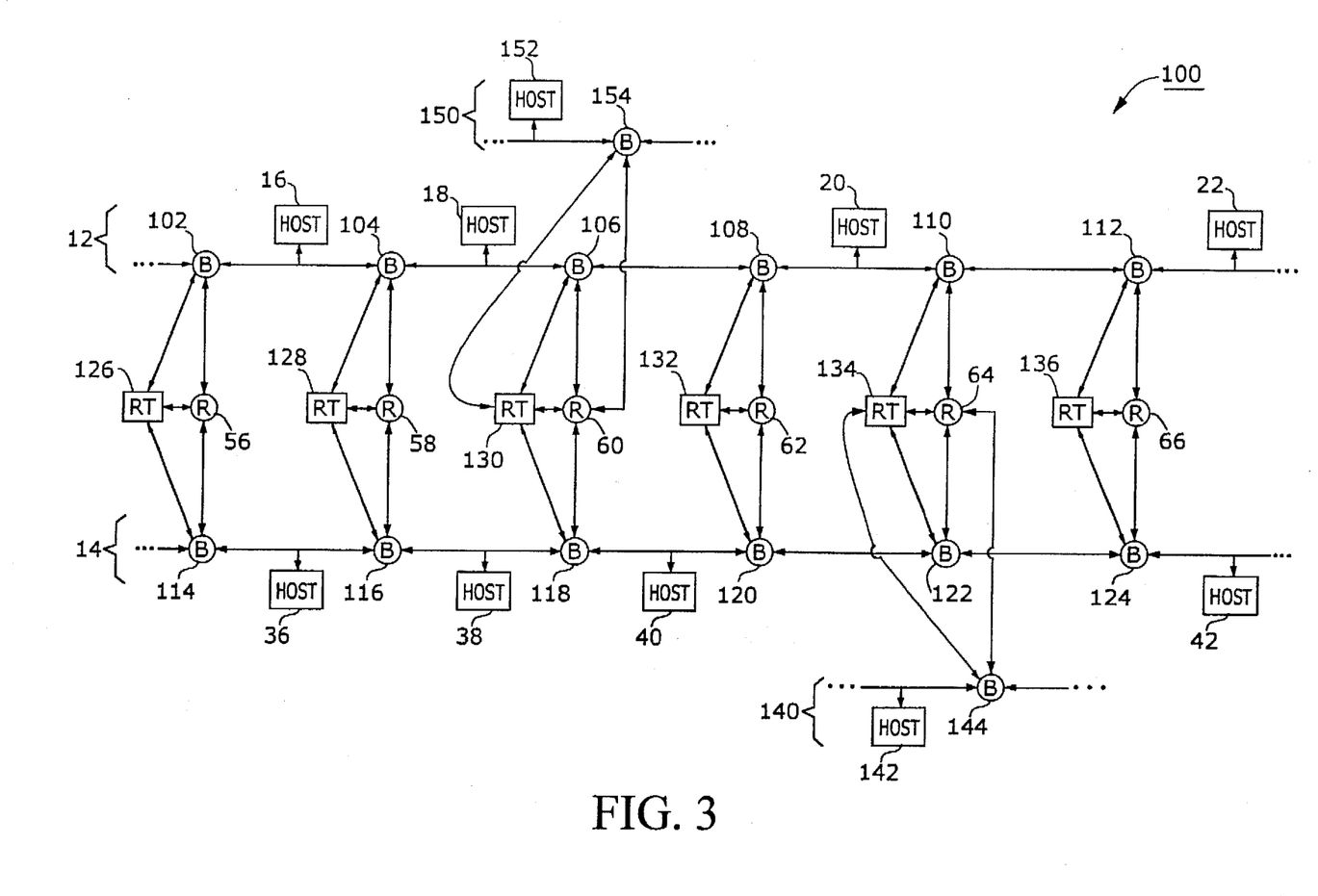
FIG. 3 is a schematic block diagram of a system of computer networks according to the present invention.

Referring to FIG. 3, there is shown a schematic block diagram of a computer network system 100. Many of the components of this system 100 are common with those shown in FIG. 1, and so they share common numerical designations. For instance, the computer networks 12 and 14, the hosts 16, 18, 20, 22, 36, 38, 40, and 42, and the routers 56, 58, 60, 62, 64, and 66 are all common between the system 10 of FIG. 1 and the system 100 of FIG. 3.

The system 100 comprises bridges 102, 104, 106, 108, 110, 112, 114, 116, 118, 120, 122, and 124. The system 100 also comprises routing databases, or tables, 126, 128, 130, 132, 134, and 136. The bridges 102, 104, 106, 108, 110, 112, 114, 116, 118, 120, 122, and 124 are capable of accessing information that is contained in associated routing databases, or tables, 126, 128, 130, 132, 134, and 136. The bridges 102, 104, 106, 108, 110, 112, 114, 116, 118, 120, 122, and 124 are also capable of identifying and, in certain circumstances, modifying RIP update messages based upon information retrieved from the associated routing databases, or tables, 126, 128, 130, 132, 134, and 136, as will be described in more detail below.

To better illustrate the presently disclosed method and apparatus, the system 100 is also shown comprising a third computer network 140 having a host 142 and a bridge 144, which has access to routing database, or table, 134, and a fourth computer network 150 having a host 152 and a bridge 154, which has access to routing database, or table, 130.

As described above, router 60, for example, will broadcast a RIP message containing the pair (12, 1) on network 14 and a RIP message containing the pair (14, 1) on network 12. It should be noted that the RIP messages broadcast by router 60 on networks 12 and 14 will also contain the pair (150, 1), meaning that router 60 can reach network 150 at cost 1. It should also be noted that, according to the commonly known "split horizon" concept, either the RIP message broadcast by router 60 on network 12 or the RIP message broadcast by router 60 on network 14 will also contain the pair (140, 2), meaning that router 60 can reach network 140 at cost 2. It should further be noted that, according to the commonly known "split horizon with poison reverse" concept, the RIP message broadcast by router 60 on network 12 or the RIP message broadcast by router 60 on network 14 will also contain the pair (140, 16), meaning that network 140 cannot be reached through router 60, as will be described in detail below. It should additionally be noted that router 60 will also broadcast a RIP message containing the pairs (12, 1), (14, 1) and (140, 2) on network 150.

Upon receiving the RIP message containing the pairs (12, 1), (150, 1), and possibly either (140, 2) or (140, 16) on network 14 from router 60, bridge 120, for example, will access the associated routing database, or table, 132. An illustration of the contents of this routing database, or table, 132 is shown below.

| destination network | # of router hops (metric) | thru router |
|---|---|---|
| 12 | 1 | XX |
| 14 | 1 | XX |
| 140 | 2 | 64 |
| 150 | 2 | 60 |

It should be noted that in accordance with the most widely accepted version of RIP, a routing database, or table, typically counts an associated router when listing the number of router hops between the associated router and any given destination network. Thus, in the above illustration of routing database, or table, 132, the number of router hops between router 62 and networks 12 and 14 is one since router 62 is directly connected to networks 12 and 14. Also, the number of router hops between router 62 and networks 140 and 150 is two since any routing path from router 62 to either of networks 140 and 150 must go through at least one additional router, namely routers 64 and 60, respectively. It should also be noted that the symbol XX in the above illustration represents the fact that any routing paths from router 62 to either of networks 12 and 14 do not go through any other routers. It should further be noted that the present invention is applicable for use in accordance with the lesser accepted versions of RIP, wherein a routing database, or table, does not count an associated router when listing the number of router hops between the associated router and any given destination network.

After receiving the RIP message containing the pairs (12, 1), (150, 1), and possibly either (140, 2) or (140, 16) on network 14 from router 60, bridge 120 will compare the hop count metrics that are contained in the associated routing database, or table, 132 with the hop count metrics that are contained in the RIP message broadcast from router 60 for each destination network. If the value of a hop count metric in a pair in the received RIP message for any given destination network is not equal to the value of a hop count metric in the routing database, or table, 132 for a corresponding destination network, then the bridge 120 will forward the RIP message without modification of that pair to any connected network elements, namely router 62 and bridge 122. If, on the other hand, the value of a hop count metric in a pair in the received RIP message for any given destination network is equal to the value of a hop count metric in the routing database, or table, 132 for a corresponding destination network, then the bridge 120 will modify the RIP message by increasing the value of the hop count metric in that particular pair and then forward the RIP message to any connected network elements; i.e. router 62 and bridge 122. In other words, bridge 120 will modify the RIP message of router 60 so that it will more accurately reflect the position of router 60, relative to the position of router 62, with respect any given destination network.

In the specific example set forth above, bridge 120 will modify the RIP message broadcast on network 14 from router 60 so that it will contain the pairs (12, 16), (150, 1), and possibly (140, 16). Thus, the first pair will be modified by increasing the value of its hop count metric to 16 since the original value of its hop count metric was equal to the value of the corresponding hop count metric in the routing database, or table, 132. It should be noted that if a third pair of (140, 2) was received in the RIP message broadcast on network 14 from router 60, it will also be modified by increasing the value of its hop count metric to 16 since the original value of its hop count metric was equal to the value of the corresponding hop count metric in the routing database, or table, 132.

The actual value to which the hop count metrics are increased need only be greater than the corresponding hop count metrics in the routing database, or table, 132. The modified hop count metric value of 16 was chosen in the above-described example since that is the value used in RIP operation to indicate that a destination network is not reachable using the router that initially broadcast the RIP message.

As with respect to router 60, routers 56, 58, 62, 64, and 66 will also broadcast RIP messages containing message pairs which reflect their proximity with respect to any given destination network as measured by hop count metrics. These RIP messages will then be processed by the bridges which receive them according to the above-described RIP message modification scheme. The result of this ongoing process is that the network elements which receive the modified RIP messages will select a near optimum routing path to any given destination network.

The above-described RIP message modification technique thus essentially takes bridges into account when determining the best possible routing path within a computer network system. Such was heretofore absent in the operation of RIP, resulting in efficiency degradation within the system.

Before proceeding with any further explanation of the present invention, it should be noted that there is no need for the bridges 102, 104, 106, 108, 110, 112, 114, 116, 118, 120, 122, 124, 144, and 154 to process the RIP messages broadcast by their associated routers 56, 58, 60, 62, 64, and 66, respectively, since routers 56, 58, 60, 62, 64, and 66 have access to the information contained in their associated routing databases, or tables, 126, 128, 130, 132, 134, and 136, and the routers 56, 58, 60, 62, 64, and 66 take this information into account when formatting the RIP messages.

Figure 4:
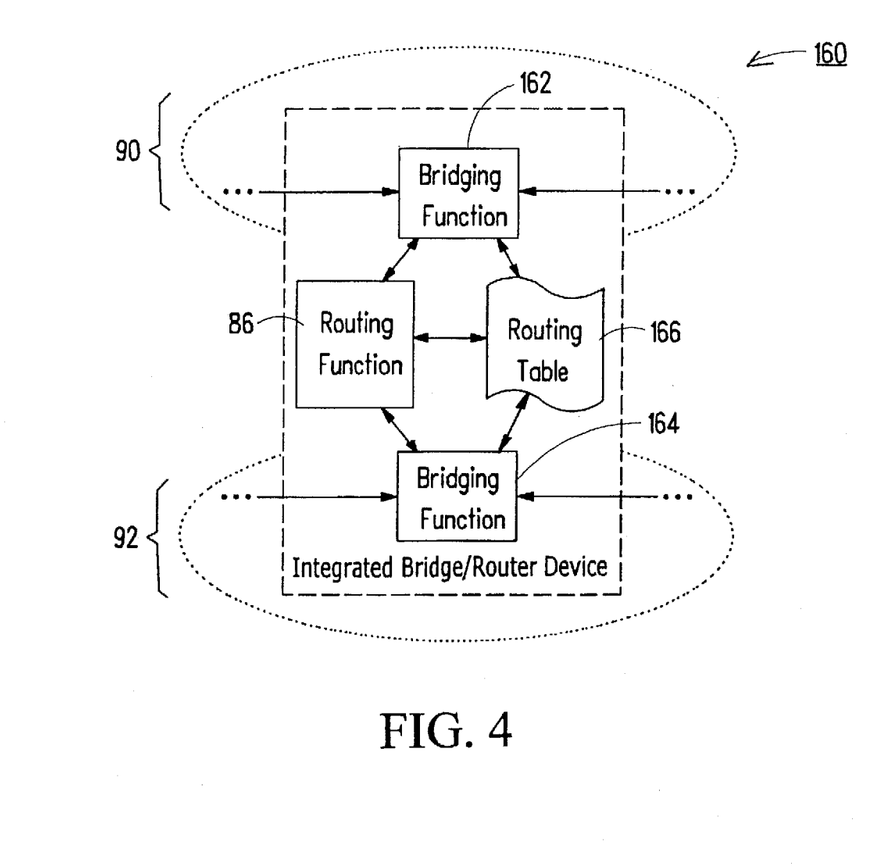
FIG. 4 is a schematic block diagram of an integrated bridge/router device according to the present invention.

FIG. 4 illustrates a block diagram of an integrated bridge/router device 160 according to the present invention. Many of the components of this integrated bridge/router device 160 are common with those shown in FIG. 2, and so they share common numerical designations. For instance, the computer networks 90 and 92 and the router 86 are all common between the integrated bridge/router device 80 of FIG. 2 and the integrated bridge/router device 160 of FIG. 4.

The integrated bridge/router device 160 comprises bridges 162 and 164, and a routing database, or table, 166. As with respect to bridges 102, 104, 106, 108, 110, 112, 114, 116, 118, 120, 122, 124, 144, and 154 of FIG. 3, bridges 162 and 164 are capable of identifying and, in certain circumstances, modifying RIP update messages based upon information retrieved from the associated routing database, or table, 166. As with respect to the routing databases, or tables, 126, 128, 130, 132, 134, and 136 of FIG. 3, routing database, or table, 166 allows the associated bridges 162 and 164 to access information contained therein. Thus, the presently disclosed integrated bridge/router device 160 may be employed in the computer network system 100 of FIG. 3, or any other network system containing a plurality of interconnected networks which are interconnected by routers and bridges.

Figure 5:
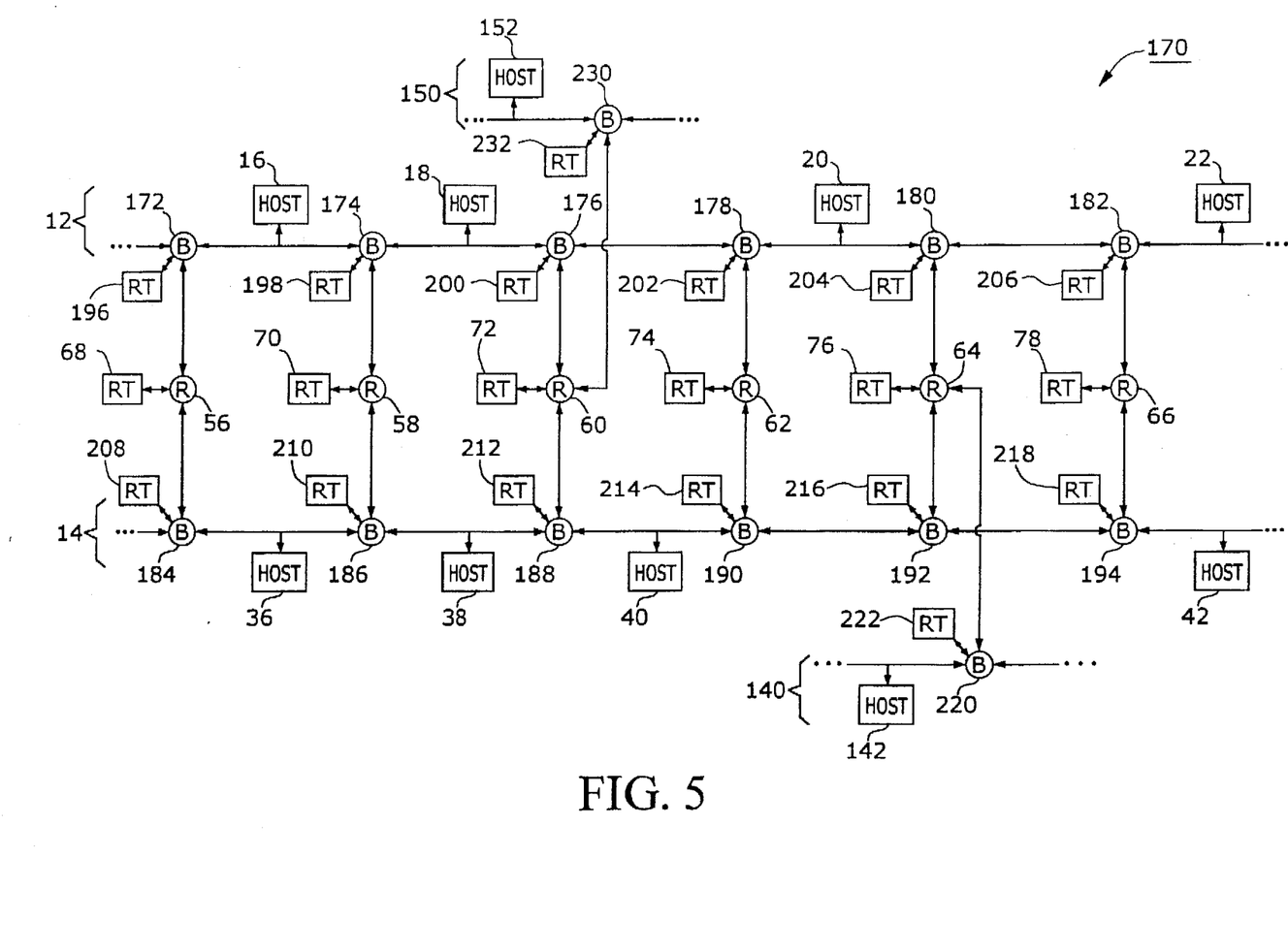
FIG. 5 is a schematic block diagram of an alternate embodiment of a system of computer networks in accordance with the present invention.

FIG. 5 illustrates a block diagram of a computer network system 170 comprising a plurality of computer networks which are operable in accordance with the presently disclosed method. Many of the components of the system 170 are common with those shown in FIGS. 1 and 3, and so they share common numerical designations.

The system 170 comprises bridges 172, 174, 176, 178, 180, 182, 184, 186, 188, 190, 192, 194, 220, and 230, and routing information databases, or tables, 196, 198, 200, 202, 204, 206, 208, 210, 212, 214, 216, 218, 222, and 232. As with respect to bridges 102, 104, 106, 108, 110, 112, 114, 116, 118, 120, 122, 124, 144, and 154 of FIG. 3, bridges 172, 174, 176, 178, 180, 182, 184, 186, 188, 190, 192, 194, 220, and 230 are capable of identifying and, in certain circumstances, modifying RIP update messages according to information provided by the associated routing information databases, or tables, 196, 198, 200, 202, 204, 206, 208, 210, 212, 214, 216, 218, 222, and 232. Routing information databases, or tables, 196, 198, 200, 202, 204, 206, 208, 210, 212, 214, 216, 218, 222, and 232 are unique in that they contain routing information for any routers which are directly connected to associated bridges 172, 174, 176, 178, 180, 182, 184, 186, 188, 190, 192, 194, 220, and 230. These routing information databases, or tables, 196, 198, 200, 202, 204, 206, 208, 210, 212, 214, 216, 218, 222, and 232 allow associated bridges 172, 174, 176, 178, 180, 182, 184, 186, 188, 190, 192, 194, 220, and 230 to access the routing information contained therein. Thus, these routing information databases, or tables, 196, 198, 200, 202, 204, 206, 208, 210, 212, 214, 216, 218, 222, and 232 are separate from the routing databases, or tables, 68, 70, 72, 74, 76, and 78, although both contain similar information. Such routing information databases, or tables, 196, 198, 200, 202, 204, 206, 208, 210, 212, 214, 216, 218, 222, and 232 are beneficial when the bridges 172, 174, 176, 178, 180, 182, 184, 186, 188, 190, 192, 194, 220, and 230 and the associated routers 56, 58, 60, 62, 64, and 66 are located remote from each other.

In operation, bridges 172, 174, 176, 178, 180, 182, 184, 186, 188, 190, 192, 194, 220, and 230 of system 170 will modify RIP messages broadcast by unassociated routers if it is determined upon comparing the hop count metrics that are contained in these RIP messages with the hop count metrics that are contained in the associated routing information databases, or tables, 196, 198, 200, 202, 204, 206, 208, 210, 212, 214, 216, 218, 222, and 232 that preferable, more direct, routing paths are available. In other words, bridges 172, 174, 176, 178, 180, 182, 184, 186, 188, 190, 192, 194, 220, and 230 will modify RIP messages broadcast by unassociated routers so that they will more accurately reflect the positions of associated routers 56, 58, 60, 62, 64, and 66, relative to the positions of the unassociated routers, with respect any given destination network.

Figure 6:
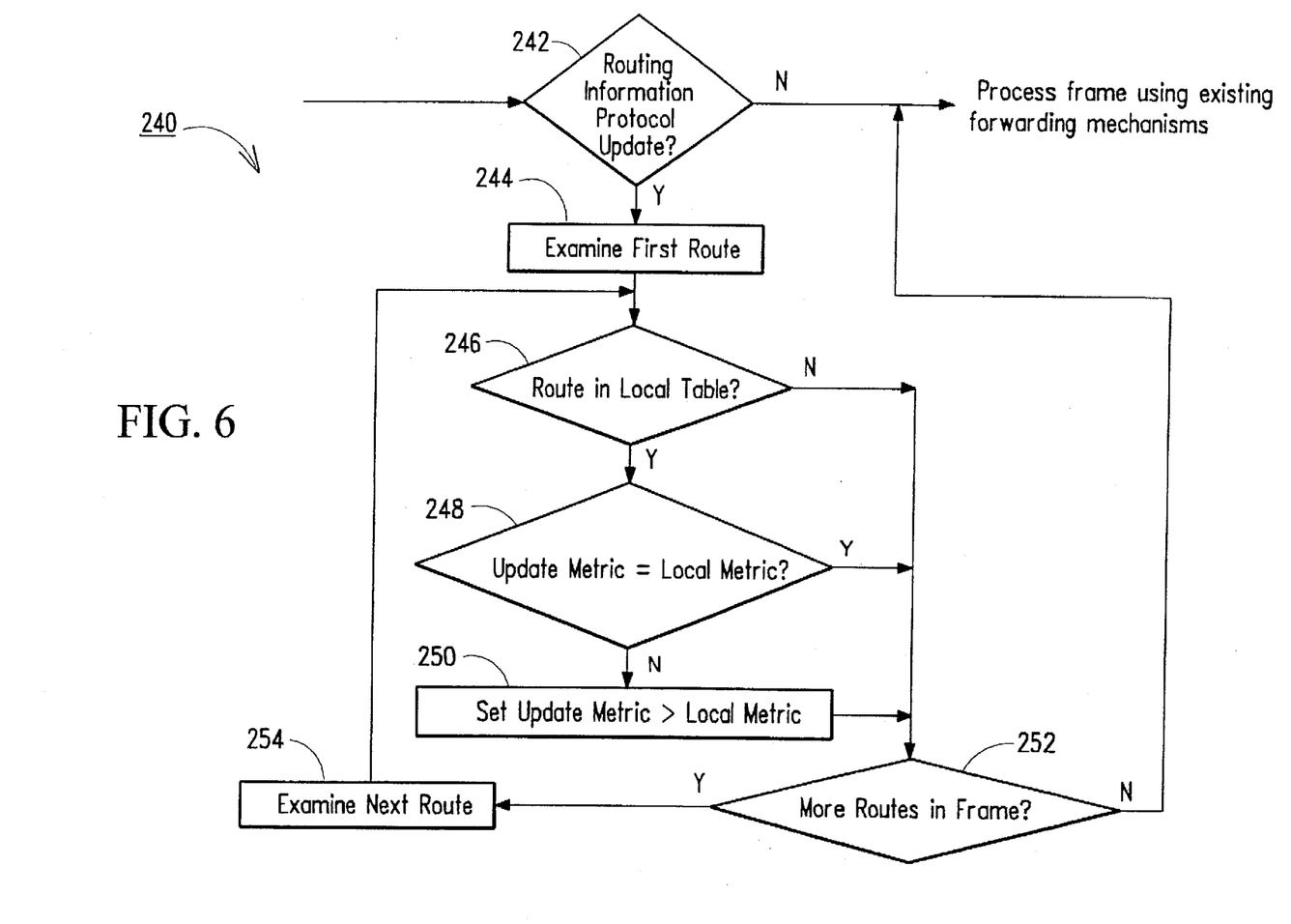
FIG. 6 is a flowchart illustrating a RIP message modification method in accordance with the present invention.

FIG. 6 illustrates a flowchart depicting the typical steps of a RIP message modification method 240 according to the present invention. In a first step 242, a RIP message is received and a determination is made whether such a RIP message is a RIP update message. At this point it should be noted that this first step 242, as well as all of the subsequent steps, are essentially performed by a single bridge based upon information contained in an associated routing database, or table.

If the RIP message is not a RIP update message, the RIP message is processed and forwarded in a manner consistent with typical RIP operation. If, on the other hand, the RIP message is a RIP update message, then, in a second step 244, a first message pair in the RIP update message is examined. In a third step 246, a determination is made as to whether or not a routing path is listed in the associated routing database, or table, for the destination network address contained in the first message pair. If there is no routing path listed in the associated routing database, or table, for the destination network address contained in the first message pair, then the method 240 directs skipping to a subsequent sixth step 252, which is described in detail below. If, on the other hand, there is a routing path listed in the associated routing database, or table, for the destination network address contained in the first message pair, then, in a fourth step 248, a comparison is made between the hop count metric that is contained in the associated routing database, or table, and the hop count metric that is contained in the RIP update message. If the value of the hop count metric in the RIP update message is not equal to the value of the hop count metric in the routing database, or table, then the method 240 directs skipping to the sixth step 252, which, again, is described in detail below. If, on the other hand, the value of the hop count metric in the RIP update message is equal to the value of the hop count metric in the routing database, or table, then, in a fifth step 250, the hop count metric in the RIP update message is modified by increasing the value of the hop count metric in the RIP update message.

Once the modification in the fifth step 250 is completed, then, in the sixth step 252, a determination is made as to whether there are more message pairs in the RIP update message. If there are no more message pairs in the RIP update message, then the RIP message is further processed and forwarded in a manner consistent with typical RIP operation. If, on the other hand, there is at least one more message pair in the RIP update message, then, in a seventh step 254, the next message pair in the RIP update message is examined and processed in the manner described above with respect to steps 246 through 252.

It will be understood by those of ordinary skill in the art that other embodiments and variations on the presently disclosed embodiment may be envisioned without departing from the inventive concepts disclosed herein. Accordingly, the present invention is not to be viewed as limited, except in accordance with the scope and spirit of the appended claims.

What is claimed is:

1. A method for modifying update messages in a computer network system having at least two computer networks, said method comprising the steps of:

receiving an update message from an origination routing network element at an update message forwarding network element, said update message comprising a destination network address and a first integer value representing a distance between said origination routing network element and said destination network address, said update message forwarding network element having access to routing information of an associated routing network element, said routing information comprising said destination network address and a second integer value representing a distance between said associated routing network element and said destination network address, said first integer value distance being measured by a first number of routing network elements located along a first route from said origination routing network element to said destination network address, said second integer value distance being measured by a second number of routing network elements located along a second route from said associated routing network element to said destination network address;

comparing said first integer value distance with said second integer value distance; and if said first number of routing network elements is equal to said second number of routing network elements, modifying said update message by increasing the integer value of said first integer value distance to an integer value that is greater than said second number of routing network elements.

2. The method as defined in claim 1, further comprising the steps of:

determining if said update message comprises any further destination network addresses and any further integer value distances between said origination routing network element and said further destination network addresses;

if said update message comprises any further destination network addresses and any further integer value distances between said origination routing network element and said further destination network addresses, comparing said further integer value distances with corresponding integer value distances between said associated routing network element and said further destination network addresses, wherein said further integer value distances are measured by first numbers of routing network elements located along first routes from said origination routing network element to said further destination network addresses, and wherein said corresponding integer value distances are measured by corresponding second numbers of routing network elements located along second routes from said associated routing network element to said further destination network addresses; and if said first numbers of routing network elements are equal to said corresponding second numbers of routing network elements, modifying said update message by increasing the integer values of said further integer value distances to an integer value that is greater than said corresponding second numbers of routing network elements.

3. The method as defined in claim 2, further comprising the step of:

if said update message does not comprise any further destination network addresses and any further integer value distances between said origination routing network element and said further destination network addresses, forwarding said update message to other network elements.

4. A method for modifying update messages in a computer network system having at least two computer networks, said method comprising the steps of:

receiving an update message from an origination routing network element at an update message forwarding network element, said update message comprising a destination network address and a first integer value representing a distance between said origination routing network element and said destination network address, said update message forwarding network element having access to routing information of an associated routing network element, said routing information comprising said destination network address and a second integer value representing a distance between said associated routing network element and said destination network address, said first integer value distance and said second integer value distance being measured by a first number of routing network elements and a second number of routing network elements situated between said origination routing network element and said associated routing network element, respectively, and said destination network address;

comparing said first integer value distance with said second integer value distance; and if said first number of routing network elements, modifying said update message by increasing the integer value of said first integer value distance to an integer value that is greater than said second number of routing network elements.

5. The method as defined in claim 4, further comprising the steps of:

determining if said update message comprises any further destination network addresses and any further integer value distances between said origination routing network element and said further destination network addresses;

if said update message comprises any further destination network addresses and any further integer value distances between said origination routing network element and said further destination network addresses, comparing said further integer value distances with corresponding integer value distances between said associated routing network element and said further destination network addresses, wherein said further integer value distances are measured by first numbers of routing network elements situated between said origination routing network element and said further destination network addresses, and wherein said corresponding integer value distances are measured by corresponding second numbers of routing network elements situated between said associated routing network element and said further destination network addresses; and if said first numbers of routing network elements are equal to said corresponding second numbers of routing network elements, modifying said update message by increasing the integer values of said further integer value distances to integer values that are greater than said corresponding second numbers of routing network elements.

6. The method as defined in claim 5, further comprising the step of:

if said update message does not comprise any further destination network addresses and any further integer value distances between said origination routing network element and said further destination network addresses, forwarding said update message to other network elements.

7. A method for modifying update messages in a computer network system having at least two computer networks, said method comprising the steps of:

receiving an update message from an origination routing network element at an update message forwarding network element, said update message comprising a destination network address and a first integer value representing a distance between said origination routing network element and said destination network address, said update message forwarding network element having access to routing information of an associated routing network element, said routing information comprising said destination network address and a second integer value representing a distance between said associated routing network element and said destination network address, said first integer value distance and said second integer value distance being measured by numbers of routing network elements situated between said origination routing network element and said associated routing network element, respectively, and said destination network address;

comparing said first integer value distance with said second integer value distance; and if said first integer value distance is equal to said second integer value distance, modifying said update message by increasing the integer value of said first integer value distance to an integer value that is greater than the integer value of said second integer value distance.

8. The method as defined in claim 7, further comprising the steps of:

determining if said update message comprises any further destination network addresses and any further integer value distances between said origination routing network element and said further destination network addresses;

if said update message comprises any further destination network addresses and any further integer value distances between said origination routing network element and said further destination network addresses, comparing said further integer value distances with corresponding integer value distances between said associated routing network element and said further destination network addresses, wherein said further integer value distances and said corresponding integer value distances are measured by numbers of routing network elements situated between said origination routing network element and said associated routing network element, respectively, and said further destination network addresses; and if said further integer value distances are equal to said corresponding integer value distances, modifying said update message by increasing the integer values of said further integer value distances to integer values that are greater than the integer values of said corresponding integer value distances.

9. The method as defined in claim 8, further comprising the step of:

if said update message does not comprise any further destination network addresses and any further integer value distances between said origination routing network element and said further destination network addresses, forwarding said update message to other network elements.

10. An apparatus for modifying update messages in a computer network system having at least two computer networks, said apparatus comprising:

a first circuit for receiving an update message from an origination routing network element, said update message comprising a destination network address and a first integer value representing a distance between said origination routing network element and said destination network address, said first circuit having access to routing information of an associated routing network element, said routing information comprising said destination network address and a second integer value representing a distance between said associated routing network element and said destination network address, said first integer value distance being measured by a first number of routing network elements located along a first route from said origination routing network element to said destination network address, said second integer value distance being measured by a second number of routing network elements located along a second route from said associated routing network element to said destination network address;

a second circuit for comparing said first integer value distance with said second integer value distance; and a third circuit for modifying said update message by increasing the integer value of said first integer value distance to an integer value that is greater than said second number of routing network elements if said first number of routing network elements is equal to said second number of routing network elements.

11. The apparatus as defined in claim 10, further comprising a fourth circuit for determining if said update message comprises any further destination network addresses and any further integer value distances between said origination routing network element and said further destination network addresses.

12. The apparatus as defined in claim 11, further comprising a fifth circuit for forwarding said update message to other network elements if said update message does not comprise any further destination network addresses and any further integer value distances between said origination routing network element and said further destination network addresses.

13. An apparatus for modifying update messages in a computer network system having at least two computer networks, said apparatus comprising:

a first circuit for receiving an update message from an origination routing network element, said update message comprising a destination network address and a first integer value representing a distance between said origination routing network element and said destination network address, said first circuit having access to routing information of an associated routing network element, said routing information comprising said destination network address and a second integer value representing a distance between said associated routing network element and said destination network address, said first integer value distance and said second integer value distance being measured by a first number of routing network elements and a second number of routing network elements situated between said origination routing network element and said associated routing network element, respectively, and said destination network address;

a second circuit for comparing said first integer value distance with said second integer value distance; and a third circuit for modifying said update message by increasing the integer value of said first integer value distance to an integer value that is greater than said second number of routing network elements if said first number of routing network elements is equal to said second number of routing network elements.

14. The apparatus as defined in claim 13, further comprising a fourth circuit for determining if said update message comprises any further destination network addresses and any further integer value distances between said origination routing network element and said further destination network addresses.

15. The apparatus as defined in claim 14, further comprising a fifth circuit for forwarding said update message to other network elements if said update message does not comprise any further destination network addresses and any further integer value distances between said origination routing network element and said further destination network addresses.

16. An apparatus for modifying update messages in a computer network system having at least two computer networks, said apparatus comprising:

a first circuit for receiving an update message from an origination routing network element, said update message comprising a destination network address and a first integer value representing a distance between said origination routing network element and said destination network address, said first circuit having access to routing information of an associated routing network element, said routing information comprising said destination network address and a second integer value representing a distance between said associated routing network element and said destination network address, said first integer value distance and said second integer value distance being measured by numbers of routing network elements situated between said origination routing network element and said associated routing network element, respectively, and said destination network address;

a second circuit for comparing said first integer value distance with said second integer value distance; and a third circuit for modifying said update message by increasing the integer value of said first integer value distance to an integer value that is greater than the integer value of said second integer value distance.

17. The apparatus as defined in claim 16, further comprising a fourth circuit for determining if said update message comprises any further destination network addresses and any further integer value distances between said origination routing network element and said further destination network addresses.

18. The apparatus as defined in claim 17, further comprising a fifth circuit for forwarding said update message to other network elements if said update message does not comprise any further destination network addresses and any further integer value distances between said origination routing network element and said further destination network addresses.

19. A method for modifying update messages in a computer network system having at least two computer networks, said method comprising the step of modifying an update message from an origination routing network element at an update message forwarding network element, said update message comprising a destination network address and a first integer value representing a distance between said origination routing network element and said destination network address, said update message forwarding network element having access to routing information of an associated routing network element, said routing information comprising said destination network address and a second integer value representing a distance between said associated routing network element and said destination network address, said step of modifying comprising increasing the integer value of said first integer value distance over the integer value of said second integer value distance so as to more accurately reflect the position of said origination routing network element, relative to the position of said associated routing network element, with respect to said destination network address.

20. An apparatus for modifying update messages in a computer network system having at least two computer networks, said apparatus comprising a circuit for modifying an update message from an origination routing network element at an update message forwarding network element, said update message comprising a destination network address and a first integer value representing a distance between said origination routing network element and said destination network address, said update message forwarding network element having access to routing information of an associated routing network element, said routing information comprising said destination network address and a second integer value representing a distance between said associated routing network element and said destination network address, said circuit modifying said update message by increasing the integer value of said first integer value distance over the integer value of said second integer value distance so as to more accurately reflect the position of said origination routing network element, relative to the position of said associated routing network element, with respect to said destination network address.

21. A method for modifying update messages in a computer network system having:

an update message forwarding network element;

an origination routing network element for transmitting an update message to said update message forwarding network element;

a routing network element associated with said update message forwarding network element;

wherein said update message comprises a destination network address and a first integer value representing a distance between said origination routing network element and said destination network address, said update message forwarding network element having access to routing information of said associated routing network element, said routing information comprising said destination network address and a second integer value representing a distance between said associated routing network element and said destination network address, said method comprising the step of:

modifying the integer value of said first integer value distance based upon a comparison of said first integer value distance with said second integer value distance.

22. The method of claim 21, wherein said first integer value distance and said second integer value distance are measured by a first number of routing network elements and a second number of routing network elements situated between said origination routing network element and said associated routing network element, respectively, and said destination network address.

23. The method of claim 22, wherein said modifying step includes the step of increasing said first integer value distance if the integer value of said first integer value distance is equal to the integer value of said second integer value distance.

* * * * *

UNITED STATES PATENT AND TRADEMARK OFFICE
CERTIFICATE OF CORRECTION

PATENT NO    : 5,754,790
DATED        : May 19, 1998
INVENTOR(S)  : Robert M. France et al.

It is certified that error appears in the above-identified patent and that said Letters Patent is hereby corrected as shown below:

Column 9, line 3 reads, "if said first number of routing network elements, modifying..."

should read --if said first number of routing network elements is equal to said second number of routing network elements, modifying...--

Signed and Sealed this

Twenty-seventh Day of March, 2001

*Attest:*

NICHOLAS P. GODICI

*Attesting Officer*   *Acting Director of the United States Patent and Trademark Office*